(12) United States Patent
Woenarta

(10) Patent No.: US 11,098,783 B2
(45) Date of Patent: Aug. 24, 2021

(54) VIBRATION DAMPERS, SHUT-OFF VALVES, AND METHODS FOR FILLING VIBRATION DAMPERS

(71) Applicants: ThyssenKrupp Bilstein GmbH, Ennepetal (DE); thyssenkrupp AG, Essen (DE)

(72) Inventor: Freddy Woenarta, Braunschweig (DE)

(73) Assignees: THYSSENKRUPP BILSTEIN GMBH, Ennepetal (DE); THYSSENKRUPP AG, Essen (DE)

(*) Notice: Subject to any disclaimer, the term of this patent is extended or adjusted under 35 U.S.C. 154(b) by 0 days.

(21) Appl. No.: 16/526,341

(22) Filed: Jul. 30, 2019

(65) Prior Publication Data

US 2020/0040960 A1 Feb. 6, 2020

(30) Foreign Application Priority Data

Aug. 3, 2018 (DE) .................... 10 2018 118 911.7

(51) Int. Cl.
*F16F 9/43* (2006.01)
*F16F 9/34* (2006.01)
*F16K 21/18* (2006.01)

(52) U.S. Cl.
CPC ................ *F16F 9/43* (2013.01); *F16F 9/34* (2013.01); *F16K 21/18* (2013.01); *F16F 2230/06* (2013.01)

(58) Field of Classification Search
CPC .... B60G 15/12; B60G 17/00; B60G 17/0523; B60G 17/056; B60G 2206/93; B60G 2500/203; F16F 9/34; F16F 9/46; F16F 2230/06; F16F 9/43
See application file for complete search history.

(56) References Cited

U.S. PATENT DOCUMENTS

| 1,575,845 | A | | 3/1926 | Joyce | |
|---|---|---|---|---|---|
| 3,558,153 | A | | 1/1971 | Strauff | |
| 5,205,581 | A | * | 4/1993 | Kallenbach | B60G 17/04 280/124.161 |
| 5,567,023 | A | * | 10/1996 | Yoo | B60T 8/364 303/119.2 |
| 5,725,239 | A | * | 3/1998 | de Molina | B60G 17/0152 188/266.6 |

(Continued)

FOREIGN PATENT DOCUMENTS

| AT | 390491 B | 5/1990 |
|---|---|---|
| AT | 403725 B | 5/1998 |

(Continued)

*Primary Examiner* — Thomas W Irvin
(74) *Attorney, Agent, or Firm* — thyssenkrupp North America, LLC

(57) ABSTRACT

A vibration damper may be used in connection with a motor vehicle. The vibration damper may include a hydraulic device for damping vibrations. The vibration damper may also include at least one shut-off valve connected fluidically to the hydraulic device at the vibration damper. The shut-off valve may be capable of being connected fluidically to at least one of a pump or a filling apparatus for filling the vibration damper with hydraulic fluid. The shut-off valve may comprise a valve housing with a first connector for the pump, a second connector for the filling apparatus, and a third connector for the hydraulic device.

5 Claims, 2 Drawing Sheets

(56) References Cited

U.S. PATENT DOCUMENTS

| | | | | |
|---|---|---|---|---|
| 8,839,920 B2* | 9/2014 | Anderson | ............... | F03G 3/00 |
| | | | | 188/322.21 |
| 8,936,139 B2* | 1/2015 | Galasso | ............... | B60G 11/27 |
| | | | | 188/322.21 |
| 9,186,949 B2* | 11/2015 | Galasso | ............... | B60G 11/27 |
| 9,523,406 B2* | 12/2016 | Galasso | ............... | B60G 15/10 |
| 10,145,435 B2* | 12/2018 | Galasso | ............... | B60G 11/27 |
| 2006/0060438 A1* | 3/2006 | Honma | ............ | B60G 17/0432 |
| | | | | 188/318 |
| 2009/0250021 A1* | 10/2009 | Zarrabi | ............ | F02M 51/0671 |
| | | | | 123/90.11 |
| 2015/0100206 A1* | 4/2015 | Galasso | ............... | B60G 11/27 |
| | | | | 701/37 |
| 2016/0069411 A1* | 3/2016 | Galasso | ............ | B60G 17/0523 |
| | | | | 267/64.26 |
| 2016/0319899 A1* | 11/2016 | Galasso | ............ | B60G 17/0523 |
| 2018/0264908 A1* | 9/2018 | Masamura | ............ | B60G 13/08 |
| 2018/0281544 A1* | 10/2018 | Masamura | ............ | B60G 13/08 |
| 2018/0281550 A1* | 10/2018 | Masamura | ............ | F16F 9/469 |
| 2019/0389271 A1* | 12/2019 | Zanziger | ............... | B60G 17/08 |
| 2020/0173513 A1* | 6/2020 | Woenarta | ............... | F16F 9/44 |

FOREIGN PATENT DOCUMENTS

| | | |
|---|---|---|
| CN | 203730644 U | 7/2014 |
| DE | 19529360 A | 4/1996 |
| DE | 20200601989 U | 5/2007 |
| EP | 2469120 A | 6/2012 |

* cited by examiner

VIBRATION DAMPERS, SHUT-OFF VALVES, AND METHODS FOR FILLING VIBRATION DAMPERS

CROSS REFERENCE TO RELATED APPLICATION

This application is a U.S. nonprovisional application that claims priority to German Patent Application No. DE 10 2018 118 911.7, filed Aug. 3, 2018, the entire contents of which are incorporated herein by reference.

FIELD

The present disclosure generally relates to vibration dampers for motor vehicles, including shut-off valves for vibration dampers and methods for filling vibration dampers with hydraulic fluid.

BACKGROUND

Vibration dampers for motor vehicles having a hydraulic device for damping vibrations are known. The hydraulic device of the vibration damper converts kinetic energy into thermal energy by way of fluid friction. This takes place in a known way by virtue of the fact that the throughflow of the hydraulic oil is braked by way of valve passages. It is known for an active vibration damping system to connect the compression and rebound stage of the vibration damper to an external motor pump. The preassembled motor pump is usually delivered together with the vibration damper as one unit which is filled with hydraulic oil. Problems can occur during the final assembly of the active vibration damper if the installation space in the vehicle is limited and the assembly of the active vibration damper is impeded as a result of the restricted installation space.

Thus, at the very least, a need exists for a vibration damper that is easy to assemble and install into a vehicle.

DETAILED DESCRIPTION

Figure 1:
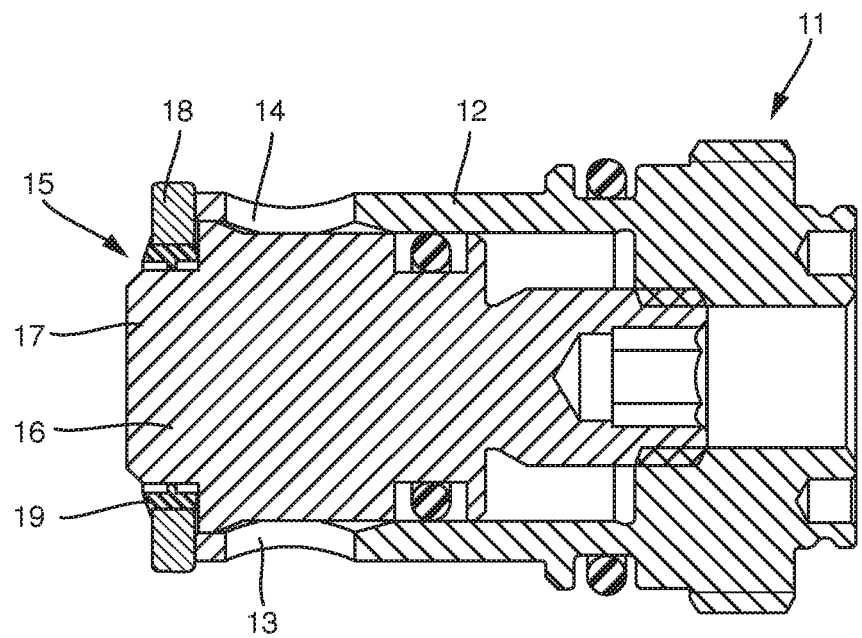
FIG. 1 is a longitudinal sectional view through an example shut-off valve for a vibration damper, which shut-off valve is situated in a closed position.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to vibration dampers, shut-off valves, and methods for filling vibration dampers.

In some examples, a vibration damper for a motor vehicle may comprise a hydraulic device for damping vibrations. The vibration damper may further comprise at least one shut-off valve that is connected fluidically to the hydraulic device at the vibration damper. The shut-off valve can be connected fluidically to a pump and/or a filling apparatus for filling the vibration damper with hydraulic fluid.

One advantage of the present disclosure is that the vibration damper can be filled with hydraulic fluid independently of the motor pump and can be handled as a self-contained unit, that is to say without the pump. To this end, the vibration damper comprises at least one shut-off valve on the vibration damper, which shut-off valve is connected fluidically to the hydraulic device. The shut-off valve can be connected fluidically as required to a pump and/or a filling apparatus for filling the vibration damper with hydraulic fluid. After being filled with hydraulic fluid, the vibration damper is closed in a fluid-tight manner by way of the shut-off valve, with the result that the filled vibration damper forms a unit which can be handled and installed independently of the pump.

In some examples, the shut-off valve can be connected fluidically both to the filling apparatus and to the pump, that is to say the two connectors are integrated into one and the same shut-off valve. It is also possible to provide a plurality of separate shut-off valves which in each case comprise a connector for the filling apparatus and a connector for the pump. The vibration damper can be connected by way of the shut-off valve to the filling apparatus during the filling operation. When the vibration damper is filled to the required level, it is also closed by way of the shut-off valve and the filling apparatus is removed. The vibration damper can then be installed without problems. For connection to the pump which is likewise filled with hydraulic fluid, the shut-off valve can be connected fluidically to the said pump. In the assembled state, the preassembled pump can therefore be connected simply to the preassembled vibration damper. The system which is formed in this way makes an active vibration damping system possible.

The shut-off valve may be arranged on the vibration damper, specifically directly on the vibration damper. The shut-off valve forms a part of the vibration damper. In other words, the shut-off valve is integrated into the vibration damper.

For instance, the shut-off valve can comprise a valve housing with at least one first connector for the pump, at least one second connector for the filling apparatus, and at least one third connector for the hydraulic device. As a result, a shut-off valve is provided in a simple way, into which shut-off valve a plurality of functionalities are integrated. By way of one and the same shut-off valve, the vibration damper can be connected fluidically firstly to the filling apparatus and secondly (in the assembled state) to the pump. The third connector is connected permanently to the hydraulic device. The shut-off valve therefore forms the interface between the vibration damper and peripheral devices such as the filling apparatus and the pump.

In another example, the shut-off valve comprises an adjustable shut-off element which, in the closed position, interrupts firstly the fluidic connection to the hydraulic device and secondly the fluidic connection to the pump and/or the filling apparatus. The functional capability of the shut-off valve is therefore provided even at high pressure.

The shut-off element can comprise a shut-off plunger which is mounted in the valve housing of the shut-off valve such that it can be moved axially. This example is of simple and robust construction and can be operated simply.

A section of the shut-off plunger may project beyond the valve housing to the outside. A ring is connected coaxially to the section by way of a seal which is arranged on the inner circumference of the ring. In the assembled state, the ring serves as a rest for the valve block or another fastening region of the vibration damper, to which the shut-off valve is connected. The seal on the inner circumference of the ring has a dual function. Firstly, the seal seals the shut-off plunger in the closed position with respect to the housing and the surroundings, with the result that no hydraulic fluid can pass out of the vibration damper when the shut-off valve is closed. Secondly, the seal fixes and centres the ring on the plunger during the mounting, as a result of which the assembly of the vibration damper is facilitated.

The first connector may be angled in relation to a longitudinal axis of the shut-off valve. Therefore, the shut-off valve can be connected to different overall designs of the vibration damper with a correspondingly arranged hydraulic device. The third connector on one side and the first and/or second connector on the other side may be disposed at an angle of 90°±45°.

The flow cross section of the third connector can be greater in each case than the flow cross section of the first connector and/or the flow cross section of the second connector.

Within the scope of the present disclosure, furthermore, a vehicle having a vibration damper according to the present disclosure is disclosed and claimed, in particular having at least two, in some cases four, vibration dampers.

Within the scope of the present disclosure, furthermore, the use of a shut-off valve for filling a vibration damper and/or for connecting a pump to the vibration damper is disclosed and claimed. The shut-off valve is connected fluidically firstly to a hydraulic device of the vibration damper and secondly to the pump and/or a filling apparatus for filling the vibration damper with hydraulic fluid.

In some example methods of the present disclosure for filling a vibration damper, a shut-off valve is used which is connected fluidically to a hydraulic device of the vibration damper. In one example, the following steps are carried out:
  connecting of a filling apparatus for the feed of hydraulic fluid to the shut-off valve;
  filling of the hydraulic device with hydraulic fluid;
  shutting off of the filling apparatus by way of the shut-off valve; and
  decoupling of the filling apparatus from the shut-off valve.

In some example methods, a pump is connected to the shut-off valve, and the shut-off valve is then opened.

The shut-off valve 11 is used in the assembled state in conjunction with a vibration damper (not shown). To this end, the shut-off valve 11 is connected to a valve block of the vibration damper, which valve block is situated, for example, at the bottom of a damper tube. The valve block comprises the channel system which is required for the hydraulic supply, and is connected to damper valves for the compression stage and the rebound stage. There are no restrictions at all with regard to the type of vibration damper, as long as it comprises a hydraulic device, by way of which kinetic energy is converted into thermal energy by way of fluid friction. This takes place in a known way by virtue of the fact that the throughflow of the hydraulic fluid is braked by way of valve passages.

The shut-off valve 11 is arranged on the vibration damper. This means that the shut-off valve 11 is integrated into the vibration damper, that is to say forms part of the vibration damper. The connection of the shut-off valve 11 to the valve block of the vibration damper is advantageous. Other fastening points on the vibration damper are possible.

In the assembled state, the shut-off valve 11 is connected fluidically to the hydraulic device of the vibration damper. The hydraulic device comprises the components which are required for the functionality of the vibration damper, in particular the damper valves, plungers and damper tubes. The term "hydraulic device" is to be understood generally and comprises all components which are associated with the hydraulic function of the vibration damper.

For filling and/or for the assembly, the shut-off valve 11 can be connected fluidically to a pump and a filling apparatus for filling the vibration damper with hydraulic fluid. To this end, the shut-off valve 11 comprises a valve housing 12 with a first connector 13 for the pump. The valve housing 12 comprises a second connector 14 for the filling apparatus and a third connector 15 for the hydraulic device. Here, in the assembled state of the shut-off valve 11, the third connector 15 for the hydraulic device is connected permanently to the latter. The filling apparatus is connected to the second connector 14 only during the filling operation. The first connector 13 for the pump is used during the final assembly of the vibration damper in the vehicle. In the finally assembled state, the third connector 15 and hence the hydraulic device are connected fluidically and permanently with the pump, in particular the motor pump, with the result that the compression stage and rebound stage of the hydraulic device can be influenced in an active manner by way of the pump.

Figure 2:
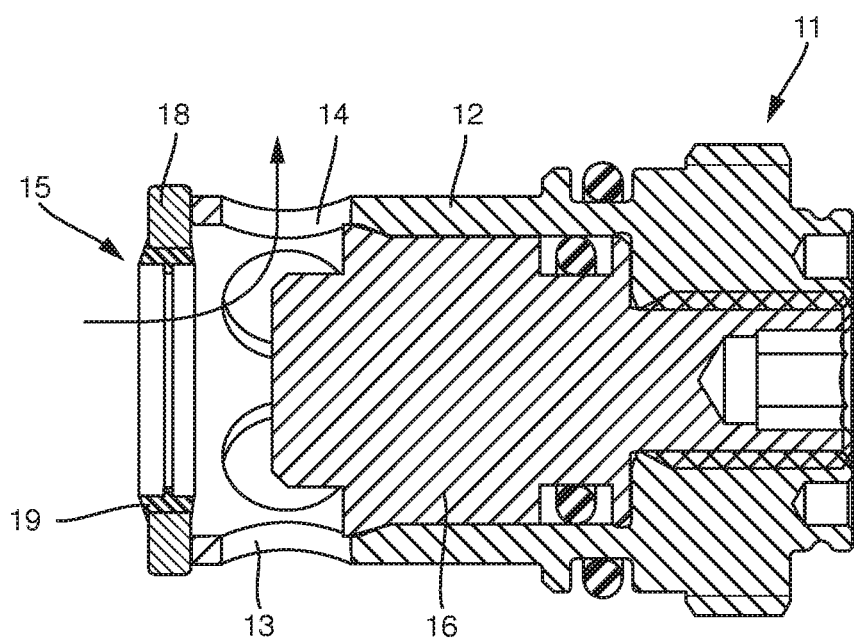
FIG. 2 is a longitudinal sectional view through the shut-off valve according to FIG. 1, which shut-off valve is situated in an open position.
Figure 3:
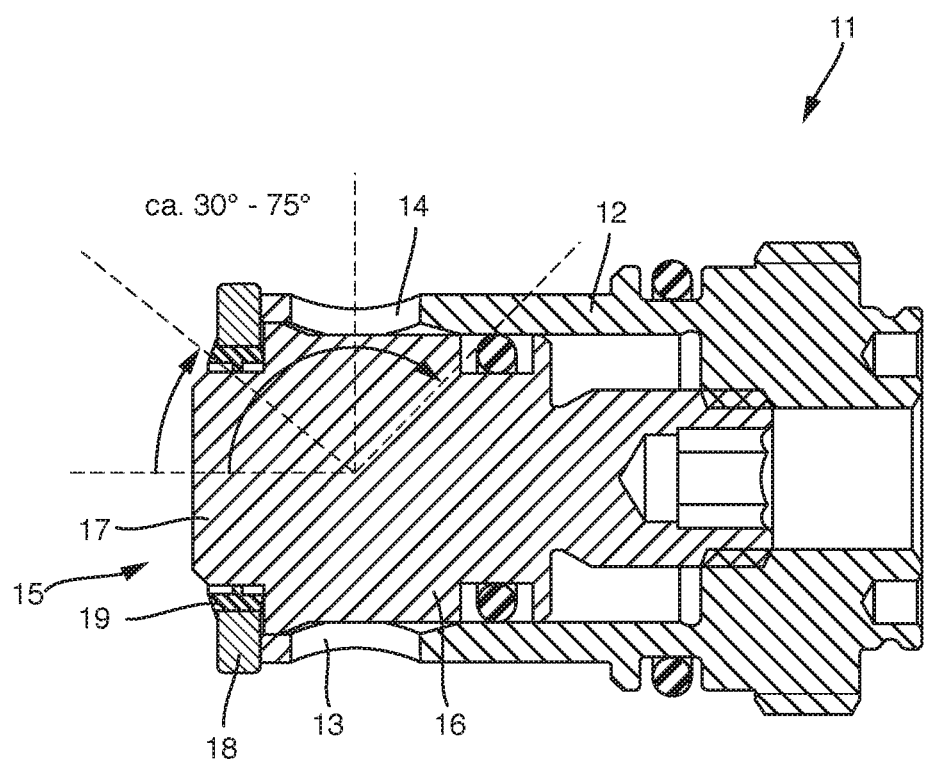
FIG. 3 is a longitudinal sectional view through the shut-off valve according to FIG. 1, wherein different angular positions for connectors are illustrated.

As shown in FIGS. 1-3, the shut-off valve 11 comprises a shut-off element 16 in the form of an axially movable shut-off plunger. The plunger can be moved to and fro in the axial direction, as indicated by way of the double arrow in FIG. 1. The shut-off valve 11 can therefore also be called a slide valve. FIG. 1 shows the shut-off valve in the closed position. Here, the shut-off plunger closes the third connector 15 for the hydraulic device and the two first and second connectors 13, 14 for the filling apparatus and the pump. FIG. 2 shows the same shut-off valve 11 in the open position. Here, the shut-off plunger or the shut-off element 16 in each case opens the first, second and third connector 13, 14, 15, with the result that hydraulic fluid can flow through the respective connectors.

As shown in FIG. 2, the shut-off valve 11 comprises more than one first and second connector 13, 14. Two connectors are sufficient, however, for the connection of a pump and a filling apparatus.

The shut-off plunger or the shut-off element 16 is mounted in an axially movable manner by way of a thread. To this end, a head of the shut-off plunger engages by way of an external thread into the corresponding internal thread of the valve housing 12. Using a tool, the shut-off plunger can be displaced by way of rotation in the axial direction, that is to say along the longitudinal axis of the plunger. The shut-off plunger can thus be moved out of the closed position (FIG. 1) into the open position (FIG. 2) and vice versa.

As can be seen in FIG. 1, the shut-off plunger comprises a section 17 which projects beyond the valve housing 12 in the longitudinal direction of the shut-off plunger. In other words, a part of the shut-off plunger protrudes out of the valve housing 12. The shut-off plunger and therefore also the section 17 are configured to be rotationally symmetrical or cylindrical in sections.

In the closed position, as shown in FIG. 1, a ring 18 is arranged coaxially with respect to the section 17 which lies against the end side of the valve housing 12. A seal 19 is arranged on the inner circumference of the ring 18, which seal 19 holds the ring 18 on the section 17. The ring 18 can be mounted easily as a result. Moreover, a separate and complicated orientation of the ring 18 in relation to the shut-off plunger is dispensed with. In the assembled state, the ring 18 is arranged between the valve housing 12 and the valve block (not shown) and is clamped in there. The seal 19 causes the shut-off valve 11 to be sealed in the closed state.

There are various design variants for the shut-off valve 11.

For instance, the third connector 15 can act as an inlet, and the first and second connector 13, 14 can in each case act as an outlet. The inlet and outlet can be swapped over, with the result that, as an alternative, the first and second connector 13 can act as an inlet, and the third connector 15 can act as an outlet.

As shown in FIG. 3, the inlet and/or outlet and/or the corresponding connectors can be angled.

The transfer of the shut-off valve 11 out of the closed position into the open position and vice versa functions independently of whether high pressure prevails in the vibration damper.

In order to fill the vibration damper, a filling apparatus (not shown) is connected to the shut-off valve 11, specifically to the first connector 13. The second connector 14 which is provided for the connection of the pump is closed in a fluid-tight manner during the filling operation. After the connecting of the filling apparatus, the hydraulic device of the vibration damper is filled with hydraulic fluid via the shut-off valve 11.

When the vibration damper is filled completely, the shut-off valve 11 is closed and the filling apparatus is decoupled from the shut-off valve 11. The vibration damper is therefore a unit which can be handled in a self-contained manner and can be installed as a unit of this type. The connection of the vibration damper to an external motor pump takes place during the final assembly. Here, the external motor pump is prefilled with hydraulic fluid.

After the external motor pump is connected fluidically to the second connector 14, the shut-off valve 11 is moved into the open position, as can be seen in FIG. 2.

The active vibration damper is then ready for operation.

LIST OF REFERENCE NUMERALS

10 Free
11 Shut-off valve
12 Valve housing
13 First connector
14 Second connector
15 Third connector
16 Shut-off element
17 Section
18 Ring
19 Seal

What is claimed is:

1. A vibration damper for a motor vehicle comprising:
a hydraulic device for damping vibrations; and
a shut-off valve connected fluidically to the hydraulic device, wherein the shut-off valve comprises a valve housing with a first connector for a pump, a second connector for a filling apparatus for filling the vibration damper with hydraulic fluid, and a third connector for the hydraulic device,
wherein a flow cross section of the third connector is greater than at least one of a flow cross section of the first connector or a flow cross section of the second connector.

2. The vibration damper of claim 1 wherein the first connector is angled relative to a longitudinal axis of the shut-off valve.

3. The vibration damper of claim 1 wherein the third connector on a first side and at least one of the first connector or the second connector on a second side are positioned at an angle of 90°±45°.

4. A vibration damper for a motor vehicle comprising:
a hydraulic device for damping vibrations; and
a shut-off valve connected fluidically to the hydraulic device, wherein the shut-off valve comprises a valve housing with a first connector for a pump, a second connector for a filling apparatus for filling the vibration damper with hydraulic fluid, and a third connector for the hydraulic device,
wherein the shut-off valve comprises an adjustable shut-off element, wherein in a closed position the adjustable shut-off element shuts off firstly a fluidic connection to the hydraulic device and secondly a fluidic connection to the at least one of the pump or the filling apparatus,
wherein the adjustable shut-off element comprises a shut-off plunger mounted in a valve housing of the shut-off valve such that the shut-off plunger is axially movable,
wherein a section of the shut-off plunger projects beyond the valve housing, wherein a ring is connected coaxially to the section by way of a seal disposed on an inner circumference of the ring.

5. A vibration damper for a motor vehicle comprising:
a hydraulic device for damping vibrations; and
a shut-off valve connected fluidically to the hydraulic device, wherein the shut-off valve comprises a valve housing with a first connector for a pump, a second connector for a filling apparatus for filling the vibration damper with hydraulic fluid, and a third connector for the hydraulic device, wherein a flow cross section of the third connector is greater than at least one of a flow cross section of the first connector or a flow cross section of the second connector.

* * * * *